Sept. 4, 1928.
B. H. SMITH
1,682,940
FLEXIBLE PIPE SEALING MEANS
Filed Jan. 10, 1927
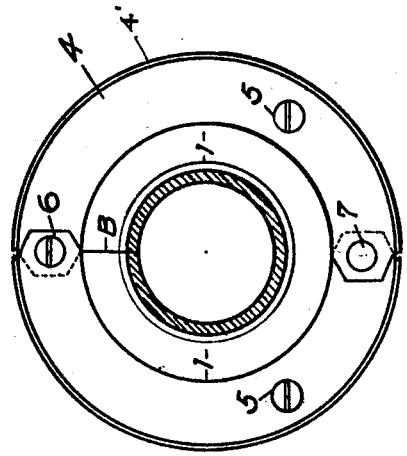
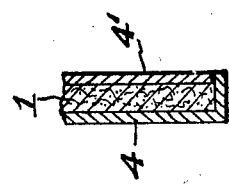
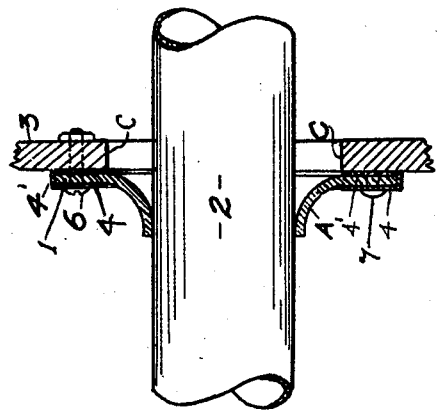
INVENTOR.
BERT H. SMITH
BY
U.G. Charles
ATTORNEY.

Patented Sept. 4, 1928.

1,682,940

UNITED STATES PATENT OFFICE.

BERT H. SMITH, OF HORTON, KANSAS.

FLEXIBLE PIPE-SEALING MEANS.

Application filed January 10, 1927. Serial No. 160,288.

My invention relates to a flexible pipe sealing means as a closing means for an opening through which the pipe extends.

The object of my invention is to provide a flexible means attached to a wall having an aperture through which a steam pipe or the like extends, the said means being flexible to allow for vibration, expansion and contraction without causing an opening between the contacting edges of said means to the pipe.

A further object of my invention is to provide a separable binding means for the closing means to the wall.

A still further object of my invention is to provide a flexible closing means having flanges to engage snugly with the periphery of the pipe, and the said flexible means having a joint as separating means to enter the pipe.

These and other objects will hereinafter be more fully explained.

Referring to the drawings:

Fig. 1 is a sectional view through the wall and sealing means, the pipe being in elevation.

Fig. 2 is a transverse view of Fig. 1, the pipe being in section.

Fig. 3 is an enlarged detailed sectional view through the semi-circular members and washer at the periphery.

The mechanism herein disclosed is applied principally to railway train service wherein it is required that excess circulation or thrust of air through pipe openings in the cab of a locomotive shall be eliminated.

To accomplish this I have provided an effective means consisting of an asbestos fiber washer 1 having a peripheral flange about the aperture as at A to engage snugly on the pipe 2. As a means to place the washer on the pipe, one side is severed at the line B, then by separating the ends by a twist of the washer the pipe will enter the aperture thereof. The said washer is rigidly attached to the wall 3 by means of semi-circular members 4 and 4' engaging therewith which are attached to said wall by bolts 5 and 6 spaced as shown in Fig. 2. The members 4' have laterally turned edges on their outer periphery functioning as a receiving means for both the washer and the semi-circular members 4. The said members 4 and 4' are pivotally connected at the point 7 by which means the segments will open to receive the washer after it has been placed on the pipe. The free ends of the members are firmly attached by apertures that will register when said ends are closed and through which the bolt 6 will engage binding the ends together and to the wall simultaneously as shown in Fig. 1.

The opening or aperture C through the wall is shown to be much larger than the pipe, which is often the case, and being larger eliminates the possibility of the pipe engaging therewith avoiding vibration and unnecessary noise as would occur should the pipe contact with the wall.

As a means to close the opening the washer thus made and applied will accomplish the result desired as the outward turn of the flare tends to close snugly around the pipe and simultaneously yield to the vibration thereof and being made of asbestos will eliminate the possibility of fire or undue charring as would occur in the use of leather or other inflammable material.

I do not confine the washer to be made exclusively of asbestos as some pipes may not be steam or hot water conveying means. In such case, other flexible material may be employed.

Such modifications may be made as lie within the scope of the appended claims.

Having thus described my invention, what I claim as new and desire to secure by Letters Patent is:—

1. In a flexible pipe sealing means, in combination, a wall, a pipe, and a washer, the washer having the peripheral edge of the aperture turned outward to engage on the pipe, said washer being severed at one side through which the said pipe will enter, semi-annular member to receive the outer peripheral portion of the washer, means for attaching said member and the washer simultaneously to the wall as closing means for the opening in said wall through which the pipe extends.

2. In a pipe and a flexible pipe sealing means, a flexible washer as a resilient closing means around the pipe positioned therein, the outside peripheral edge of the washer to engage on the side of a wall as closing means for an aperture therein and through which the pipe extends, annular members pivotally connected and adapted to engage on both sides of the washer, and means for attaching the said members to the wall, simultaneously binding the washer firmly, for the purpose described.

3. In a flexible pipe sealing means, an annular flexible asbestos member having an aperture through the transversely extended portion from the side thereof as closing means for an aperture in a wall through which a pipe extends, annular jointed members pivotally connected at one of the joints, perforations in the ends adjacent the other joint so that the said perforations will register when the ends are lapped, the said members functioning as supporting and binding means for the annular flexible member to the wall, substantially as shown and for the purpose described.

4. In a flexible pipe sealing means, in combination with an aperture wall and a pipe extending through the aperture, a washer having an aperture concentrically positioned the peripheral edge of the aperture extending outward, said washer being severed radially at one side as separating means to enter said pipe, pivotally connected members to engage snugly as supporting means for the outer peripheral portion of the washer when placed concentrically over the aperture said washer functioning as flexible sealing means around the pipe, all as, and for the purpose described.

5. In a flexible pipe sealing means, a flaring washer, two semi-circular members on one side of the washer, and two semi-circular members on the other side of the washer, the last said members having flanges to receive the washer and the first said members, means to connect said semi-circular members together and attach said members simultaneously to a wall.

6. In a flexible pipe sealing means, a flared flexible asbestos washer having a radial cut through one side as means to place the washer on a pipe, two semi-circular members to engage on the opposite side from the flange extension, two semi-circular members pivotally connected for the other side of the washer having a flange on the periphery thereof to receive the peripheral edge of the washer and the first said semi-circular members, an aperture in the free ends of said members to register and receive bolts when said members are closed, the bolt functioning as a binding means for the members and attaching means to the wall simultaneously.

BERT H. SMITH.